Patented May 23, 1950

2,508,718

UNITED STATES PATENT OFFICE 2,508,718

PREPARATION OF AMPHOTERIC AMIDES OF ACRYLIC ACID AND THEIR POLYMERS

Giffin D. Jones, Easton, Pa., assignor to General Aniline & Film Corporation, New York, N. Y., a corporation of Delaware No Drawing. Application October 16, 1945, Serial No. 622,703

9 Claims. (Cl. 260—80.3)

The present invention relates to the production of amphoteric N-substituted amides of acrylic acid and α-substituted acrylic acids and their polymers. More particularly, the invention relates to the production of such amides having at least one amino group and at least one carboxyl group and their polymers. The amides of the invention are those of acrylic acid and α-substituted acrylic acids, which are substitued in the alpha-position by aliphatic hydrocarbon radicals as, for example, ethyl, methyl, propyl, butyl, amyl, etc.; by cycloaliphatic hydrocarbon radicals as, for example, cyclohexyl; by aryl and aralkyl hydrocarbon radicals, as for example, phenyl and benzyl; and by halogen as, for example, chlorine and bromine.

My new amphoteric amides are characterized by having attached to the amido N-atom an aliphatic radical containing at least one amino or substituted amino group and one free carboxyl group. The monomeric compounds readily polymerize to form new polymers which have properties similar to gelatin and may be used as gelatin substitutes or together with gelatin as a gelatin modifier. The compounds are also characterized by having a high protective colloid action as is indicated by their low gold number.

One preferred form of my invention relates to the production of monomeric and polymeric mono-(N-methacryl)-lysine. The monomer of this compound readily polymerizes to form water-soluble products which have excellent protective colloid action. This compound as well as the other monomers coming within the scope of my invention may be interpolymerized with other polymerizable compounds containing a $CH_2=C<$ group.

It is a primary object of my invention to produce monomeric and polymeric amphoteric amides of acids of the acrylic acid series.

A more particular object of my invention is to prepare monomers and polymers of mono-(N-acryl)-lysine and mono-(N-methacryl)-lysine.

It is a further object of my invention to produce polymers which are suitable as gelatin substitutes and as gelatin modifiers and which possess a high protective colloid action.

According to my invention, amphoteric amides of the acrylic acid series are obtained by reacting an acrylic acid chloride, such as, for example, methacryl chloride, acryl chloride, or α-chloracryl chloride, or the corresponding anhydrides with an aliphatic polyamino carboxylic acid in which the amino groups are free or mono-substituted by aliphatic or alkyl groups. An acid salt of the polyamino acids may be employed such as the hydrochloric or acetic acid salts, for example, the monohydrochloride, mono-acetate, or dihydrochloride, or the diacetate salts. The reaction is preferably carried out in the presence of an alkali, such as sodium hydroxide, potassium hydroxide, or any strong base, to neutralize any acid formed during the reaction, as for example, hydrochloric or acetic acid. The monomer which results is separated from the reaction mixture and after purification may be polymerized.

In one embodiment which illustrates the principles of my invention, methacryl chloride is reacted with dl-lysine monohydrochloride in the presence of sodium hydroxide in aqueous solution which is kept at a low temperature, preferably about —5° C. The N-methacryllysine which formed is extracted with a solvent from which it is separated by precipitating with a liquid medium in which it is insoluble, or by evaporation of the solvent. The monomer readily polymerized on standing at room temperature after a few minutes to a colorless transparent gel.

Instead of the dl-lysine, l-lysine and d-lysine may be utilized. As examples of other suitable aliphatic polyamino carboxylic acids which may be used to form amphoteric acrylamides are the dl-, d- or l-optical isomers of $\alpha,\beta$-diamino propionic acid, $\alpha,\beta$-diamino butanoic, $\alpha,\gamma$-diamino butanoic, $\beta,\gamma$-diamino butanoic, $\alpha,\beta$-diamino pentanoic acid, and $\alpha,\delta$-diamino pentanoic acid. All these readily react with the halides or anhydrides of acrylic acids, to form the corresponding aminocarboxylic acryl acid amides.

In addition to methacryl chloride in the reaction, there may be employed other α-substituted acrylyl halides as, for example, α-chloracrylyl chloride, α-ethylacryl chloride, and α-cyclohexyl acrylyl chloride, etc. The monomers obtained by my invention readily undergo interpolymerization with other polymerizable materials having the group $CH_2=C<$ such as, for example, methacrylamide, methacrylic acid, methyl methacrylate, vinyl acetate, vinyl ketone, vinyl chloride and butadiene.

The reaction product of methacryl chloride and lysine which I have herein called mono-(N-methacryl)-lysine is believed to have the following structure:

As illustrative of my invention of preparing both the monomeric compounds and the polymers are the following examples: The parts are by weight unless otherwise indicated.

Example 1

To a stirred ice-cooled suspension of partially dissolved dl-lysine monohydrochloride containing 50 parts (0.274 mol) in 150 parts of water are added dropwise 37.4 parts (0.36 mol) of methacrylyl chloride over a period of three hours. A 3.13 N—NaOH solution was also added at a rate such as to keep the solution slightly alkaline to phenolphthalein. About three hours were required for the reaction, the temperature being maintained at $-5°$ C. A total of 205 parts of the alkali solution were required and after the reaction was completed, there were added 14.5 parts of 3.32 N-hydrochloric acid solution to bring the pH to about 6.0.

To the resulting solution was added a triple volume of methanol and after cooling the solution for 12 hours at $-10°$ C., it was filtered to remove a small amount of white precipitate that had formed. The mother liquor was then evaporated under reduced pressure to 150 parts and filtered from a few grams of sodium chloride which had formed during the reaction. The filtrate underwent ready polymerization after 5 minutes' standing at room temperature, forming a colorless transparent gel.

Example 2

To 10 parts of dl-lysine monohydrochloride (0.055 N) dissolved in 50 parts of water, there were added 8.2 parts of silver acetate (0.05 mol). The solution was stirred one hour and filtered. To the filtrate was added with ice cooling 8.5 parts of methacryl anhydride (0.055 mol) and 10.4 parts of a 40% solution of sodium hydroxide. After stirring three hours, the solution was filtered from a small amount of precipitate which had formed. The filtrate was extracted with acetone to remove water and the aqueous layer diluted with methanol and ether yielding a precipitate of mono-(N-methacryl)-lysine. On evaporation of the methanol-ether solution, more N-methacrylyl-lysine was obtained.

Analysis: Calculated for $C_{10}H_{18}O_3N_2$—N, 13.1. Found N, 13.

Example 3

The same procedure as in Example 1 was carried out except that an equivalent amount of acryl chloride replaced the methacrylyl chloride. Mono-(N-acryl)-lysine was obtained which readily underwent polymerization.

Example 4

Ten parts of dl-lysine hydrochloride were dissolved in 35 parts of water and with ice cooling there were added 5.7 parts of methacrylyl chloride and 10 parts of a 40% sodium hydroxide solution. After stirring three hours, the pH was adjusted to 7 by the addition of a 3.32 normal solution of hydrochloric acid and the small amount of precipitate which formed was filtered. Nine parts of the filtrate were sealed in an evacuated glass tube with an equal volume of isopropyl alcohol and irradiated with ultraviolet light at 30° C. The yield was 1.2 parts of poly-N-methacryllysine which swelled in water but which was not completely soluble therein.

Example 5

Twelve parts of mono-(N-methacryl)-lysine were sealed in a glass tube and placed under ultraviolet light at $-25°$ C. After two days, the contents of the tube were filtered and the gelatinous precipitate washed with methanol and dried in a desiccator. Poly-N-methacrylyllysine was obtained which was soluble in water.

Example 6

Two parts of mono-(N-methacryl)-lysine were dissolved in 5 parts of water, sealed in vacuo in a tube and placed under ultraviolet light at 30° C. for a period of 48 hours. A water-soluble polymer was obtained.

Example 7

A solution of 9 parts of methacrylamide and one part of mono-(N-methacryl)-lysine in 25 parts of water and 25 parts of methanol were sealed in an evacuated tube and placed under ultraviolet light at 30° C. A white precipitate filled the tube after 12 hours and after another 12 hours, the interpolymer was filtered and stirred with 200 parts of warm water in which it completely dissolved. The solution was evaporated with stirring to 50 parts and it gelled on cooling. The gel was thermo-reversible but somewhat sticky.

Example 8

One part of methacryllysine was dissolved in 20 parts of water sealed in an evacuated glass tube and placed under ultraviolet light. After two days, the solution which contained some precipitated polymer was diluted with acetone and filtered. The yield was 0.6 part of a water-soluble methacryllysine in the form of clear scales.

Example 9

Methacryllysine prepared as in Example 4 but with half the amount of methacryl chloride was diluted with an equal volume of isopropyl alcohol and placed under ultraviolet light at 35° C. in an evacuated sealed tube. An equal amount of the same monomer was polymerized without the addition of the alcohol. After a week, the tube in which was placed the isopropyl alcohol solution contained two non-viscous layers from which poly-methacryllysine was precipitated as a white sponge from the lower layer with acetone. The polymer was air dried to 5.5 parts of a white powder which was very soluble in water giving a slightly viscous solution. The relative viscosity of the polymer was 1.084 for a 1% solution at 25° C.

After a day, the second tube in which no isopropyl alcohol had been placed contained a honey-like clear solution and after a few hours had nearly gelled. The monomer was precipitated in acetone and again dried in a dessicator to a sticky polymer which was very soluble in water and gave a viscous solution having a relative viscosity of 2.13 for a 1% solution at 25° C.

Example 10

The procedure was carried out as in Example 1 except that 1 mol of $\alpha,\beta$-dichloropropionyl chloride and 1 mol of dl-lysine hydrochloride were utilized in the presence of a sufficient amount of sodium hydroxide to neutralize the hydrochloric acid formed during the reaction. The nono-N-($\alpha,\beta$-dichloropropionyl)lysine formed was dehydrohalogenated by heating with an equimolecular amount of an aqueous solution of sodium acetate. There was obtained as a result of the reaction mono-N-($\alpha$-chloracryl)-lysine. The monomer can be polymerized by subjecting it to ultraviolet light at room temperature.

Example 11

The procedure of Example 1 was also followed in connection with $\alpha,\beta$-diaminopropionic acid, $\alpha,\beta$-, $\alpha,\gamma$-, and $\beta,\gamma$-diaminobutanoic acids, and $\gamma,\delta$-diaminopentanoic acid hydrochlorides. In each case there was used 1 mol of the diamino acid with 1 mol of methacrylchloride or 1 mol of acrylyl chloride, and an equivalent amount of sodium hydroxide to neutralize the hydrochloric acid formed during the reaction. In each instance, the acrylamide or methacrylamide of the corresponding aliphatic diamino acid was obtained. Each of the monomers readily polymerized to the corresponding polymer by following the methods described.

In the production of interpolymers, the proportion of the amino acid acrylamide and the polymerizable compound interpolymerized therewith may be varied within large limits, mixtures having been prepared which range from about 1% of the former to 99% of the latter. However, the preferred ratio is about 9 to 5 of the polymerizable compound to 1 to 5 of the aminocarboxylic acrylic acid amide.

While sodium hydroxide has been disclosed in the specific examples as the neutralizing agent, it is to be understood that other alkali materials, such as potassium hydroxide and strong organic bases, such as pyridine may be utilized for the same purpose. The amount of alkali utilized should be sufficient to neutralize the hydrochloric acid formed during the reaction. In general, any diluent in which the salts formed during the reaction are insoluble may be utilized to purify the monomer from the reaction mixture. For this purpose, methyl alcohol and acetone have been found highly satisfactory.

The reaction between the acrylic acid halide and the aliphatic polyamino carboxylic acid may be carried out at any suitable temperature. It is preferred, however, to use a low temperature and during the reaction to keep the solution ice-cooled. While the temperature may vary, it is preferred to carry out the reaction within the range of 0° to about −10° C. The monomer may be recovered from the reaction solution by any suitable diluent in which it is insoluble.

The proportion of reagents utilized in preparing the monomer may vary to some extent but it is preferred to use equimolecular amounts of the acrylic acid halides and of the polyamino carboxylic acids. The alkali is used in at least equivalent amounts to neutralize the acid released during the reaction.

Polymerization of the purified monomer may be carried out in bulk, aqueous alcohol solution, or in plain water solution. Polymerization may be carried out at room temperature by permitting the monomer to stand for a short period of time. The polymerization may also be carried out in the presence of a suitable catalyst, such as benzoxyl peroxide or by merely subjecting the monomers to the action of ultraviolet light. The temperature may range over wide limits. However, it is preferred to carry out the polymerization at room temperature. If desired, temperatures as low as −25° C. may be also utilized.

The protective colloid action of the amphoteric polymers obtained by my invention may be illustrated by poly-N-methacryllysine. This polymer has a gold number of less than $2.5 \times 10^{-4}$ as compared to 0.006 for gelatin. The gold number is determined by the procedure of Zsigmondy and Joel described in Phys. Chem., Vol. 113, 299, 1944. This method utilizes the fact that the change of colloidal gold from red to blue, as affected by the addition of sodium chloride, is prevented by small amounts of protective colloids, such as gelatin. The gold number is defined as the minimal amount in milligrams per cubic centimeter of protective colloid required for preventing this change. A colloid having a low gold number in general exhibits a high protective colloid action. The test for determining the gold number of poly-N-methacryllysine was carried out in the following manner. To one cubic centimeter of individual samples varying in concentration from 0.1 gram per cc. to $2.5 \times 10^{-4}$ milligrams per cc. of poly-N-methacryllysine is added 5 cc. of red colloidal gold solution and 0.55 cc. of 10% sodium chloride solution. In the absence of the protective colloid, the addition of sodium chloride changes the red solution to blue as viewed by reflected light. The number of milligrams of the sample that are just insufficient to prevent the change from red to blue is called the "gold number."

The red gold solution was prepared according to the directions of Pollack, Am. J. Chem. Path. Tech. (Sec., vol. 8, page 8, 1944) (C. A. vol. 38, page 2356). For the determination of the necessary amount of potassium carbonate solution, there were added 4 drops of 1% alcoholic phenolphthalein to a solution of 0.5 cc. of 1% aqueous auric chloride in 50 cc. of water. This was titrated with 5% potassium carbonate to a permanent red color, 0.2 cc. being required.

For the determination of the optimum temperature, 50 cc. of water were heated to 60° C. and there was added 0.5 cc. of a 1% aqueous solution of auric chloride and 0.2 cc. of potassium chloride. The solution was heated to 80° C. and 2.5 cc. of a 5% glucose solution was added. Heating was continued to 85–86° C. at which temperature the color changed to red.

The red gold solution was then prepared by heating in a 1 liter Florence flask 500 cc. of water to 60° C., adding 5 cc. of 1% auric chloride and 4 cc. of potassium carbonate. The solution was heated to 85–86° C. and 12.5 cc. of 5% glucose solution were added. The flask was removed from the flame and rotated until the color changed from colorless to red. The solution was cooled and stored in a dark bottle. According to this test, the gold number for gelatin was 0.006. On the other hand, the gold number for poly-methacryllysine was less than $2.5 \times 10^{-4}$. Thus, it will be seen that the protective colloid action of the polymer is far superior to that of gelatin.

The above description and examples are given by way of illustration only. It is to be understood that any modifications or variations thereof that come within the spirit of the invention are intended to be included within the claims.

I claim:

1. Mono-(N-methacryl)-lysine.
2. Mono-(N-$\alpha$-chloracryl)-lysine.
3. Mono-(N-methacryl)-$\alpha,\beta$-diaminopropionic acid.
4. Polymeric mono-(N-methacryl)-lysine.
5. Polymeric mono-(N-$\alpha$-chloracryl)-lysine.
6. Polymeric mono-(N-methacryl)-$\alpha,\beta$-diaminopropionic acid.
7. An amphoteric polymerizable monomeric N-substituted amide of an acid selected from the class consisting of acrylic acid, $\alpha$-halo-substituted, and $\alpha$-alkyl-, $\alpha$-cycloaliphatic-, $\alpha$-aryl- and $\alpha$-aralkyl-hydrocarbon-substituted acrylic acids, wherein the N-substituent is an aliphatic radical of at least 3 carbon atoms which contains a free primary amino group and a free carboxyl group.

8. An amphoteric polymeric aliphatic N-substituted amide of an acid selected from the class consisting of acrylic acid, α-halo-substituted, and α-alkyl-, α-cycloaliphatic-, α-aryl-, and α-aralkyl-hydrocarbon substituted acrylic acids wherein the N-substituent is an aliphatic radical of at least 3 carbon atoms which contains a free primary amino group and a free carboxyl group.

9. An interpolymer of from 90 to 50% of methacrylamide and from 10 to 50% of mono-(N-methacryl)-lysine.

GIFFIN D. JONES.

REFERENCES CITED

The following references are of record in the file of this patent:

UNITED STATES PATENTS

| Number | Name | Date |
| --- | --- | --- |
| 2,311,548 | Jacobson et al. | Feb. 16, 1943 |
| 2,387,501 | Dietrich | Oct. 23, 1945 |
| 2,409,126 | Kenyon et al. | Oct. 8, 1946 |

OTHER REFERENCES

Schindler et al., "Helv. Chim. Acta.," vol. 25 (1942) p. 553.

Fischer et al., "Liebigs Annalen," vol. 340, p. 161.